(12) United States Patent
Murray et al.

(10) Patent No.: US 6,827,382 B2
(45) Date of Patent: Dec. 7, 2004

(54) VEHICLE PARTITION

(75) Inventors: Kurt R. Murray, Carmel, IN (US); Jeffrey T. Bounds, Fishers, IN (US)

(73) Assignee: Pro-Gard Industries, L.P., Indianapolis, IN (US)

( * ) Notice: Subject to any disclaimer, the term of this patent is extended or adjusted under 35 U.S.C. 154(b) by 0 days.

(21) Appl. No.: 10/747,858

(22) Filed: Dec. 29, 2003

(65) Prior Publication Data

US 2004/0150239 A1 Aug. 5, 2004

Related U.S. Application Data

(62) Division of application No. 10/290,568, filed on Nov. 8, 2002, now Pat. No. 6,669,259.
(60) Provisional application No. 60/348,218, filed on Nov. 9, 2001.

(51) Int. Cl.[7] .................................................. B60P 3/00
(52) U.S. Cl. ........................... 296/24.46; 296/24.41; 296/24.43; 296/24.42
(58) Field of Search .................... 296/24.46, 187.05, 296/24.4, 24.42, 190.08, 190.11, 193.06, 189, 68.1, 203.02; 280/749, 730.2, 804, 751, 748; 220/529; 211/184

(56) References Cited

U.S. PATENT DOCUMENTS

| 2,865,670 A | * | 12/1958 | Dunn ....................... 296/24.42 |
| 3,015,515 A | * | 1/1962 | Halstead et al. ......... 296/24.42 |
| 3,214,211 A | * | 10/1965 | Setina ...................... 296/24.46 |
| 3,525,535 A | * | 8/1970 | Kobori ....................... 280/749 |
| 3,547,217 A | * | 12/1970 | Garza ....................... 296/24.46 |
| 3,549,195 A | * | 12/1970 | Kallinikos ............... 296/24.46 |
| 4,015,875 A | * | 4/1977 | Setina ...................... 296/24.46 |
| 4,595,227 A | * | 6/1986 | Setina ...................... 296/24.46 |
| 4,964,666 A | * | 10/1990 | Dillon ...................... 296/24.46 |
| 5,551,842 A | * | 9/1996 | Schmid et al. ............. 417/203 |
| 5,848,817 A | * | 12/1998 | Niehaus ................... 296/24.46 |
| 6,059,313 A | * | 5/2000 | Coogan et al. .......... 296/24.43 |
| 6,286,882 B1 | * | 9/2001 | Rastetter ................. 296/24.41 |

* cited by examiner

*Primary Examiner*—Kiran Patel
(74) *Attorney, Agent, or Firm*—Baker & Daniels

(57) ABSTRACT

A vehicle security partition for use in vehicles to form a barrier between front and rear occupant areas.

20 Claims, 13 Drawing Sheets

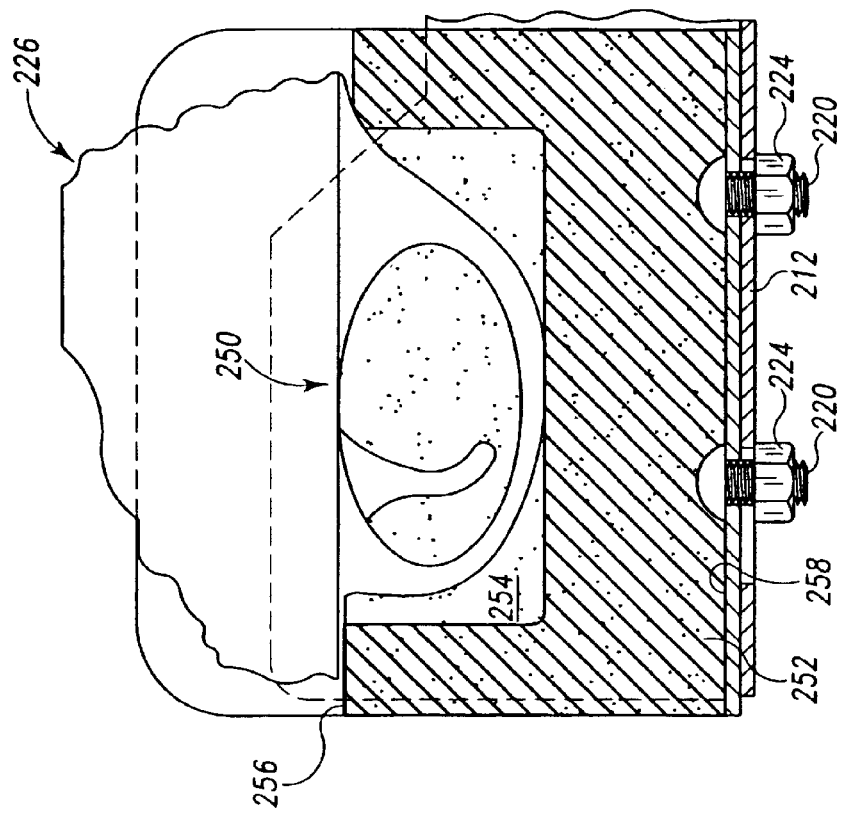
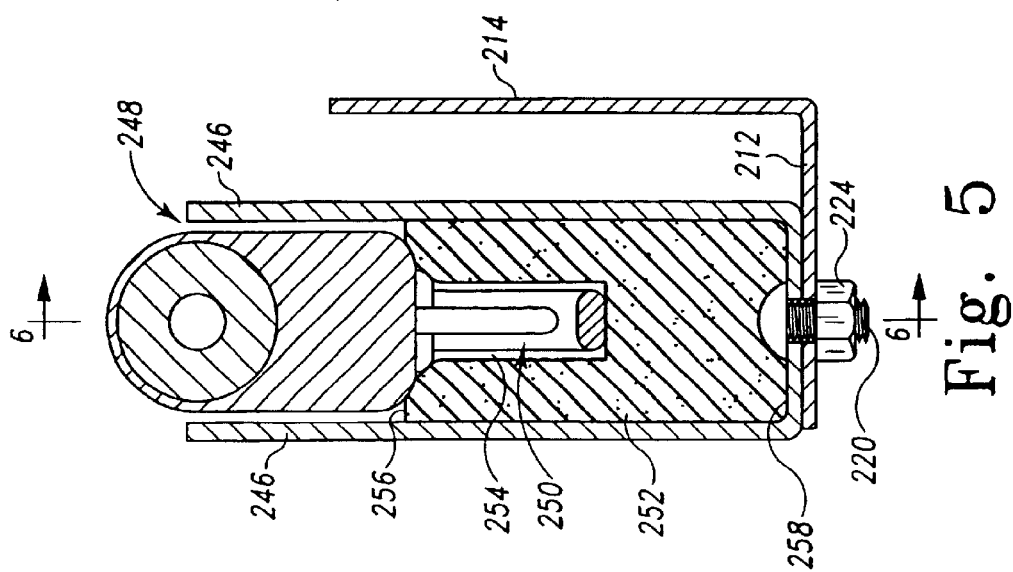
Fig. 6
Fig. 5

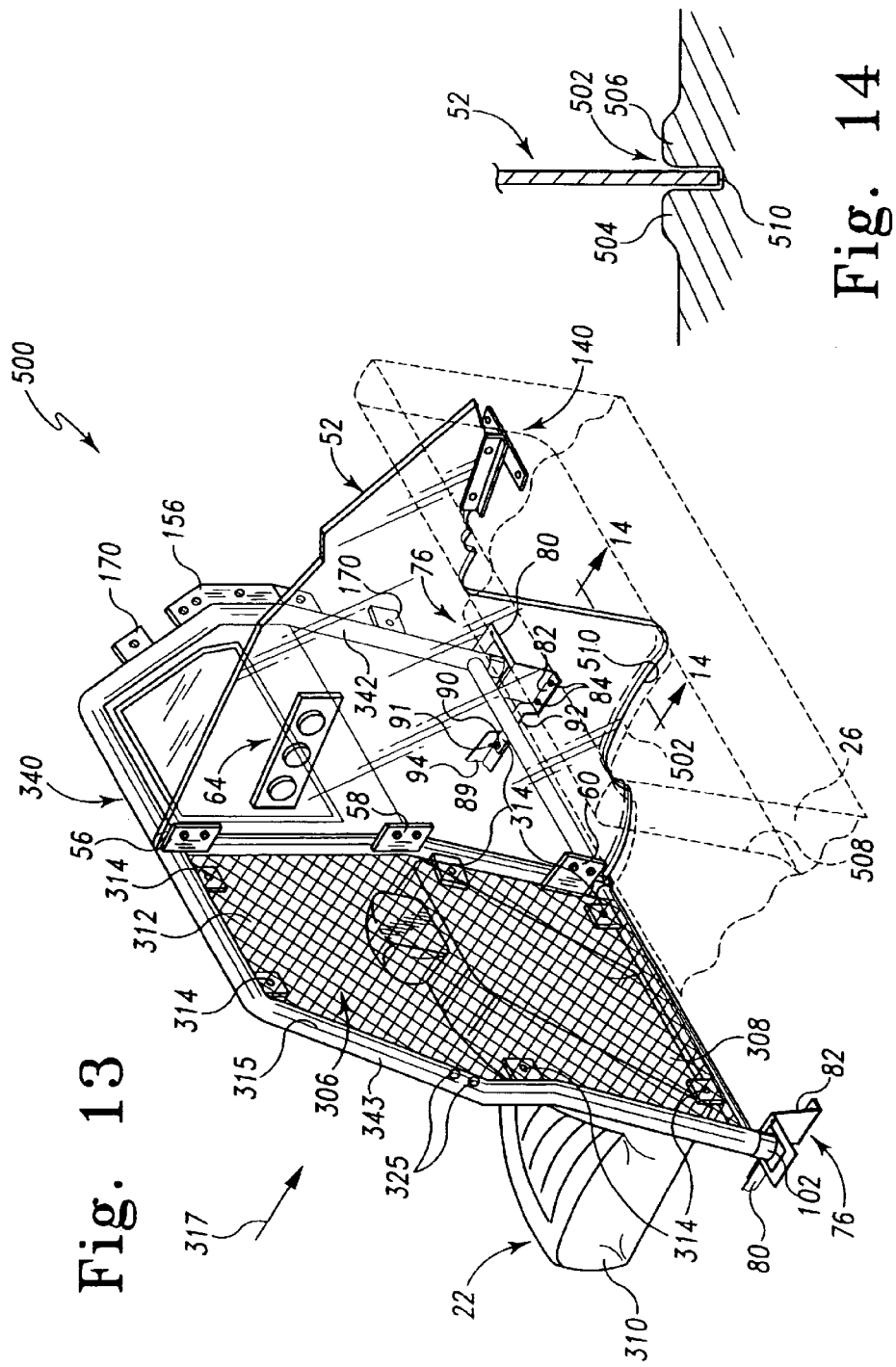

VEHICLE PARTITION

CROSS-REFERENCE TO RELATED APPLICATION

This application is a divisional of U.S. patent application Ser. No. 10/290,568, filed Nov. 8, 2002 now U.S. Pat. No. 6,669,259, which claims the benefit of U.S. Provisional Patent Application Ser. No. 60/348,218, filed Nov. 9, 2001, the disclosures of which are expressly incorporated by reference herein.

BACKGROUND AND SUMMARY OF THE INVENTION

The present invention relates generally to a vehicle security partition which forms a barrier between the front and rear occupant areas of a vehicle. More particularly, the present invention relates to such a partition which separates portions of the rear occupant area. The present invention further relates to support structures and mounting devices for vehicle partitions.

Vehicle partitions are often utilized to separate the front and rear occupant areas of vehicles, such as police cars and taxi cabs, in order to prevent access to the front seat by someone located in the rear seat. These partitions typically include a dividing panel located between the front and rear seats which forms a barrier between the front and rear occupant areas. Since vehicles using these partitions often transport a single passenger, isolating the entire rear occupant area from the front occupant area results in a significant waste of space, particularly potential storage space in the rear seat.

The present invention relates to a security partition for use in a vehicle including driver and passenger sides, front and rear occupant areas, a floor, a roof, and a pair of laterally spaced pillars extending between the roof and the floor.

In an illustrated embodiment of the present invention, a security partition includes a front panel extending laterally within the rear occupant area of the vehicle. A side panel extends substantially perpendicular relative to the front panel within the rear occupant area. A pillar clamp supports the front panel and includes a rear clamping member and a front clamping member coupled to the rear clamping member. The rear clamping member and the front clamping member are configured to be positioned on opposing sides of a pillar of the vehicle for releasably securing the front panel to the pillar. More particularly, the front clamping member is releasably secured to the rear clamping member wherein the pillar is clamped between the rear and front clamping members.

The security partition illustratively further includes a frame connected to the front panel, the frame including first and second vertically extending uprights supporting a laterally extending upper member. The frame may form a substantially U-shaped rollbar wherein the upper member is configured to contact the roof of the vehicle.

Illustratively, the frame includes at least one laterally extending lower member positioned below the upper member and extending between the first and second uprights. The frame illustratively includes a vertically extending intermediate upright positioned between the first and second uprights, wherein the at least one laterally extending lower member includes a first strut extending between the first upright and the intermediate upright and a second strut extending between the second upright and the intermediate upright.

Further illustratively, the security partition includes a gun rack having an elongated support defining a longitudinal axis, the elongated support positioned with the longitudinal axis extending substantially vertical. The gun rack illustratively includes a barrel rest provided adjacent one end of the elongated support for receiving a barrel of a weapon, and a lock mechanism provided at a central portion of the elongated support for receiving and securing the weapon therein. The gun rack may further include a weapon trigger guard provided on another end of the elongated support for receiving a trigger portion of the weapon therein, the weapon trigger guard including a base having two spaced apart side walls which extend upward from the base to form a channel for receiving a trigger assembly of the weapon. The trigger guard may further include an insert secured in the channel and including a slot in an upper surface thereof for receiving a trigger and trigger guard of the weapon.

In another illustrative embodiment of the present invention, a security partition is provided for use in a vehicle including driver and passenger sides, front and rear occupant areas, a floor, a roof, and a pair of laterally spaced pillars extending between the floor and the roof. The partition includes a front panel, and first and second vertically extending uprights, wherein the first upright is connected to the front panel. The partition further includes a laterally extending upper member extending between the first and second uprights, and at least one laterally extending lower member positioned below the upper member and extending between the first and second uprights. A vertically extending intermediate upright is illustratively positioned between the first and second uprights, wherein the at least one laterally extending lower member comprises a first strut extending between the first upright and the intermediate upright, and a second strut extending between the second upright and the intermediate upright. A clearance area is defined between the second upright and the intermediate upright. The vehicle includes a front driver seat positioned within the front occupant area proximate the driver side, wherein the clearance area has a vertical dimension and a lateral, horizontal dimension sufficient to allow passage of a pivotably mounted seat back of the driver seat therethrough.

In a further illustrated embodiment of the present invention, a security partition is provided for use in a vehicle including front and rear occupant areas, a floor, a roof, and a pair of laterally spaced pillars extending between the roof and the floor, wherein the front occupant area includes a driver seat having a pivotally mounted seat back. The partition includes a frame having first and second vertically extending uprights, and a front panel supported by the frame and extending laterally within the rear occupant area. A clearance area is defined between the second upright and the front panel, the clearance area having a vertical dimension and a lateral, horizontal dimension sufficient to allow passage of the front driver seat therethrough.

In yet another illustrated embodiment of the present invention, a security partition is provided for use in a vehicle including passenger and driver sides, front and rear occupant areas, a floor, a roof, and laterally spaced passenger side and driver side pillars coupled to the roof. The partition includes a front panel, and a first upright positioned adjacent the passenger side of the vehicle in the rear occupant area, wherein the first upright is connected to the front panel. The partition further includes a second upright positioned adjacent the driver side of the vehicle in the rear occupant area, wherein the second upright is disposed in spaced relation to the first upright. A first pillar coupler attaches the first upright to the passenger side pillar and a second pillar coupler attaches the second upright to the driver side pillar. The second pillar coupler includes a breakaway device for detaching the second upright from the driver side pillar upon application of a predetermined force.

Illustratively, both the first pillar coupler and the second pillar coupler each include a rear clamping member and a front clamping member supported by the rear clamping member, the rear clamping member and the front clamping member adapted for positioning on opposite sides of the passenger side pillar and driver side pillar, respectively, for releasably securing the frame thereto. The breakaway device of the second pillar coupler is illustratively disposed intermediate the front clamping member and the rear clamping member such that the predetermined force releases the front clamping member from the rear clamping member.

Illustratively, the front and rear clamping members of the first and second pillar couplers each include a body portion having inwardly facing locking lips. The locking lips of the front and rear clamping members cooperate to secure the pillar coupler from movement relative to one of the passenger side pillar and driver side pillar.

Additional features and advantages of the present invention will become apparent to those skilled in the art upon a consideration of the following detailed description of an illustrative embodiments exemplifying the best mode of carrying out the invention as presently perceived.

BRIEF DESCRIPTION OF THE DRAWINGS

The detailed description of the drawings particularly refers to the accompanying figures in which:

FIG. 5 is a cross-sectional view taken along line 5—5 of FIG. 4 illustrating a weapon received in the gun rack;

FIG. 6 is a cross-sectional view taken along line 6—6 of FIG. 5 illustrating a weapon received in the gun rack;

FIG. 13 is a perspective view similar to FIG. 12 illustrating a further embodiment of the security partition of the present invention;

FIG. 14 is a cross-sectional view taken along line 14—14 of FIG. 13 illustrating a side panel receiving channel.

DETAILED DESCRIPTION OF THE DRAWINGS

Figure 1:
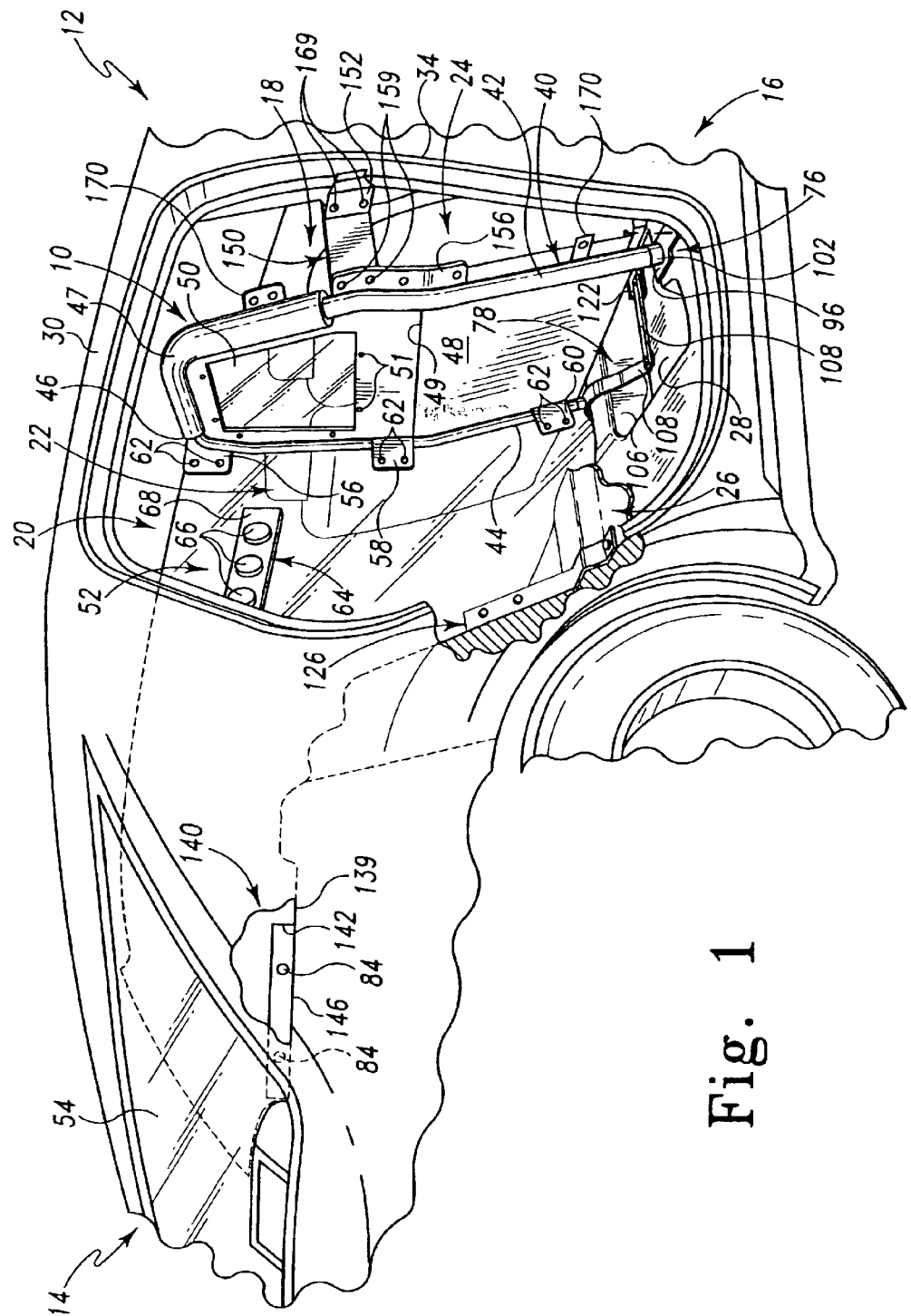
FIG. 1 is a partial perspective view with a cut-away, illustrating a security partition of the present invention in a typical installation within a vehicle.

Referring now to the drawings, FIG. 1 illustrates an embodiment of the security partition 10 of the present invention as installed in a conventional vehicle 12. The vehicle 12 may comprise any conventional automobile including, but not limited to, a police car or a taxicab. The vehicle 12 illustratively includes longitudinally extending driver and passenger sides 14 and 16 and laterally extending front and rear occupant areas 18 and 20. The front occupant area 18 illustratively includes a conventional driver seat 22 proximate the driver side 14 of the vehicle 12 and a conventional passenger seat 24 positioned proximate the passenger side 16 of the vehicle 12. While it is envisioned that the front seats 22 and 24 comprise individually adjustable, or bucket seats, the invention of FIGS. 1–2 will find equal applicability with other seating arrangements, including conventional bench seats.

Figure 7:
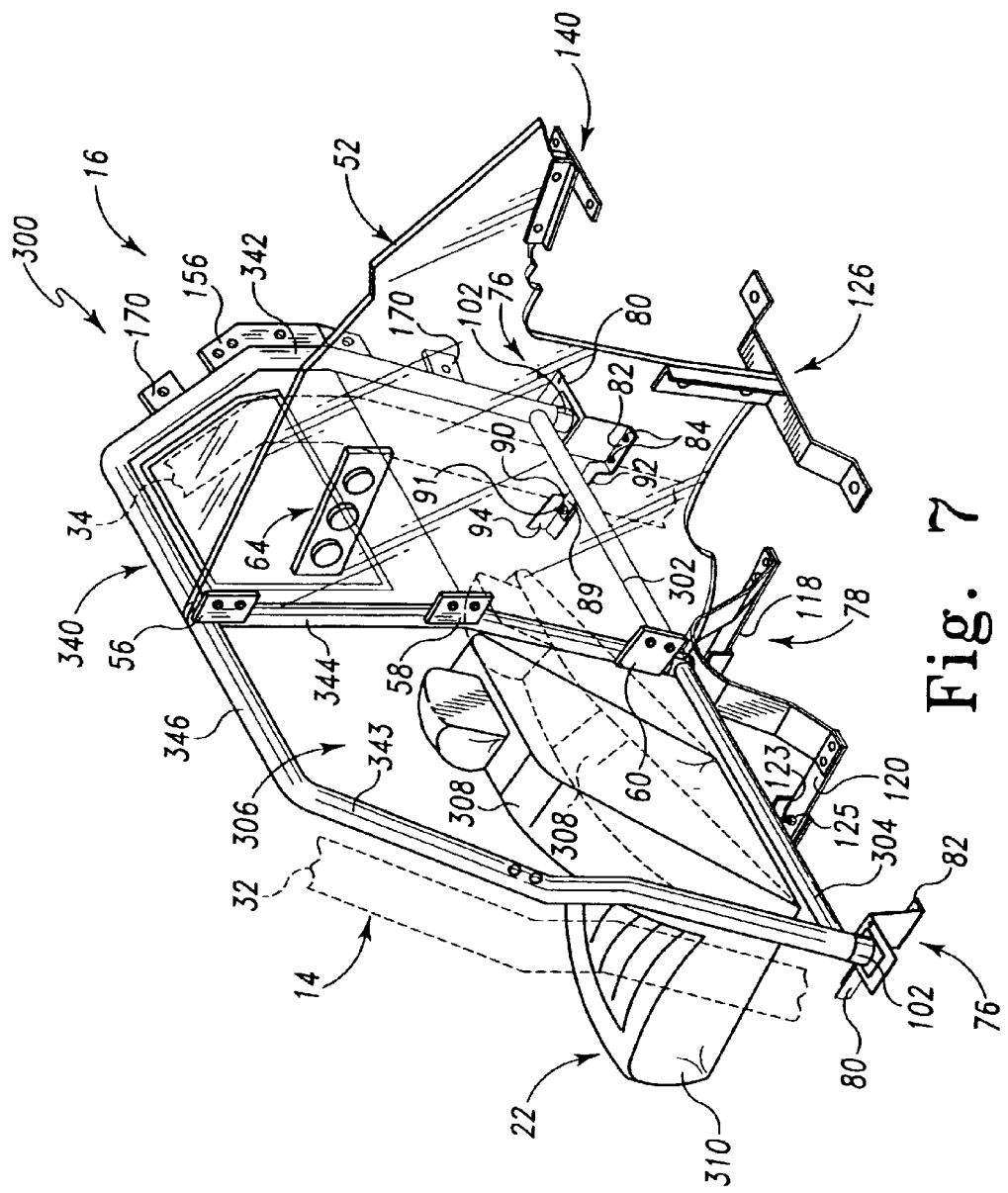
FIG. 7 is a perspective view of a further embodiment of the security partition of the present invention, illustrating a clearance area providing for the rearward passage of a driver seat through the frame.

The rear occupant area 20 illustratively includes a conventional rear bench seat 26 extending laterally between the driver side 14 and passenger side 16 of the vehicle 12. The vehicle 12 further includes a floor 28 and a roof 30 supported by a plurality of pillars, including laterally spaced door or "B" pillars 32 and 34 disposed proximate the driver and passenger sides 14 and 16, respectively (FIGS. 1 and 7). The pillars 32 and 34 extend between the floor 28 and the roof 30, and are generally positioned intermediate the front and rear occupant areas 18 and 20. The security partition 10 is installed between the front and rear occupant areas 18 and 20 in order to form a barrier and protect occupants in the front driver and passenger seats 22 and 24 from a person transported in the rear seat 26.

Figure 2:
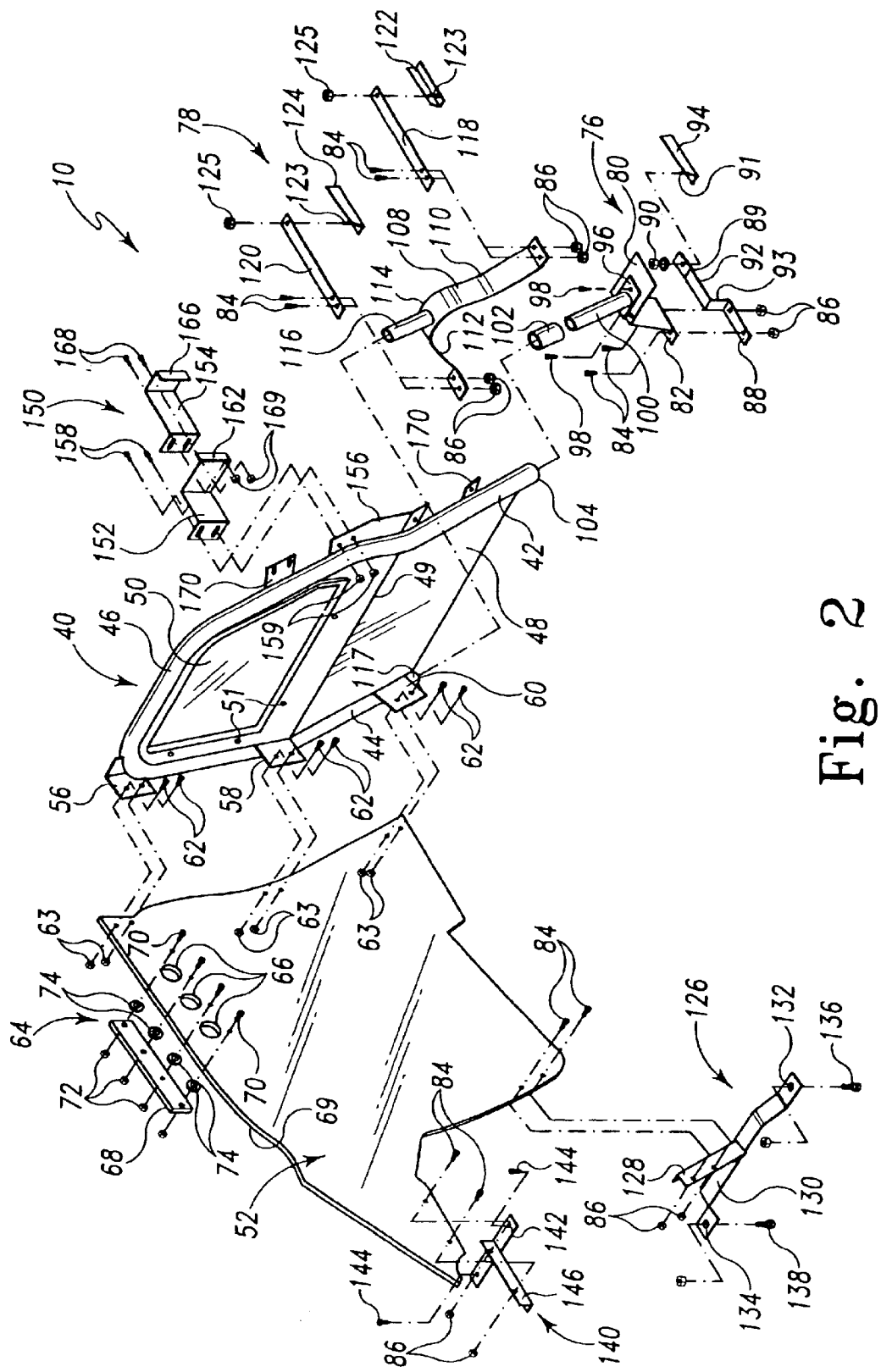
FIG. 2 is an exploded perspective view of the security partition of FIG. 1.

The security partition 10 of FIGS. 1 and 2 illustratively includes a frame 40 including a pair of uprights 42 and 44 extending vertically upwardly from proximate the floor 28 of the vehicle 12. Passenger side upright 42 is illustratively positioned proximate the passenger pillar 34, while center or intermediate upright 44 is positioned laterally proximate the longitudinal center axis of the vehicle 12 intermediate the driver and passenger pillars 30 and 34. The frame 40 further includes a laterally extending upper member 46 supported by the pair of uprights 42 and 44. The uprights 42 and 44 and the upper member 46 may be formed from an integral tubular steel member bent into a substantially U-shaped rollbar which is inverted such that the uprights 42 and 44 extend downwardly from the upper member 46. A protective sleeve or cover 47 may be received over a portion of the frame 40 in order to protect the vehicle occupants and to provide an enhanced contact surface with the roof 30 of the vehicle 12. As such, the cover 47 is illustratively formed of a durable and resilient material, such as foamed rubber, plastic or polymeric material.

A front guard panel 48 is attached to the frame 40, intermediate the pillars 32 and 34. The front panel 48 may comprise a rigid sheet material such as cold rolled steel which is spot welded to the frame 40. As illustrated in FIGS. 1 and 2, the front panel 48 may include a laterally extending bend 49 in order to accommodate the shape of the rear of the front passenger seat 24. The front panel 48 may support a window 50 to facilitate observation of a passenger in the rear seat 26 without compromising security. The window 50 illustratively comprises a transparent impact resistant material such a thermoplastic material. The window 50 is illustratively supported within the front panel 48 by conventional fasteners, such as bolts 51. Alternatively, the window 50 may comprise any number of widely available barrier components, including wire mesh with holes small enough to substantially prevent finger access to the front occupant area 18.

A side guard panel 52 extends substantially perpendicularly relative to the front panel 48 such that the security partition 10 forms a substantially L-shaped arrangement as observed in a top plan view. The side panel 52 is supported proximate to the rear seat 26 and extends longitudinally rearwardly from the upright 44 adjacent the front panel 48 to proximate a rear window 54 of the vehicle 12. A plurality of mounting flanges or tabs 56, 58 and 60 are attached to the upright 44 and cooperate with conventional fasteners, such as bolts 62 threadably engaging nuts 63, to secure the side panel 52 to the frame 40.

The side panel 52 illustratively is formed of a transparent impact resistant material, such as a thermoplastic. Alternatively, the side panel 52 may be formed of other commonly known barrier materials including sheet metal or wire mesh. The side panel 52 illustratively includes a vent 64 having a plurality of apertures 66. A vent plate 68 is secured to an outer surface 69 of the side panel 52 through conventional fasteners, such as bolts 70 threadably received within nuts 72. Spacers 74 are illustratively utilized to position the vent plate 68 in spaced relation to the outer surface 69 of the side panel 52 thereby providing an air passageway for the flow of air through the apertures 66.

The uprights 42 and 44 of the frame 40 are illustratively mounted to the floor 28 of the vehicle 12 by a side floor mount 76 and a center floor mount 78. The side floor mount 76 includes a mounting plate foot 80 including a floor mount portion 82, which is secured to a first portion 88 of an elongated mounting strap 92 by conventional fasteners, such as bolts 84 threadably engaging nuts 86. A second portion 89 of the mounting strap 92, in turn, is connected to the conventional outer seat rail 94 of the front passenger seat 24 illustratively by a nut 90 threadably engaging the preexisting seat mounting stud 91. The second portion 89 of the mounting strap 92 is positioned generally above the first portion 88 by a connecting portion 93. A mounting foot 96 is fixed to the mounting plate foot 80 using conventional fasteners, such as bolts 98. The mounting foot 96 includes an upwardly extending tubular member 100 and a spacer 102 which is concentrically received over the tubular member 100. The tubular member 100 is concentrically received within the open lower end 104 of the tubular passenger upright 42, while the spacer 102 positions the lower end 104 above the mounting foot plate 80. As may be readily appreciated, the passenger upright 42 is attached to the floor 28 of the vehicle 12 without requiring deformation of the vehicle's interior, such as by drilling holes, since the side floor mount 76 utilizes the existing conventional seat rail 94 and mounting stud 91.

The center floor mount 78 is configured to be supported above the conventional drive shaft hump 106 in the rear occupant area 20 of the vehicle 12. As such, the center floor mount 78 includes a substantially U-shaped hump bracket 108 including first and second legs 110 and 112 meeting at an apex 114. The first and second legs 110 and 112 support an upwardly extending tubular member 116 which is concentrically received within the open lower end 117 of the tubular center upright 44. The hump bracket 108 is connected to the floor 28 of the vehicle 12 by first and second elongated mounting straps 118 and 120. More particularly, a first end of each mounting strap 118 and 120 is coupled to the first and second legs 110 and 112 of the hump bracket 108 through conventional fasteners, such as bolts 84 threadably receiving nuts 86. Second ends of the mounting straps 118 and 120 are attached to the inner seat rail 122 of the front passenger seat 24 and the inner seat rail 124 of the driver seat 22, respectively, by a pre-existing seat mounting stud 123 threadably receiving a nut 125.

Illustratively, the side panel 52 is coupled to the rear seat 26 through a center seat coupling 126. The center seat coupling 126 includes an upwardly extending flange 128 supported by a base 130. The base 130 includes apertures 132 and 134 proximate its opposing ends and which are attached to the pre-existing seat belt studs 136 and 138 of the conventional rear seat 26. Alternatively, if the conventional rear seat 26 is replaced with one specifically adapted for prisoner transfer, as is known in the art, the center seat coupling 126 may be modified, as necessary, for attachment thereto. Such a replacement rear seat may comprise Prisoner Rear Seat Model No. 356001FG which is available from Pro-Gard Industries of Indianapolis, Ind.

The side panel 52 is further illustratively attached to a conventional package shelf 139 of the vehicle 12 by way of a package shelf coupling 140. The package shelf coupling 140 includes a base 142 which is attached to the package shelf 139 through conventional fasteners, such as screws 144. The base 142 supports an upwardly extending flange 146 which is fastened to the side panel 52, again through bolts 84 threadably engaging nuts 86.

Figure 3:
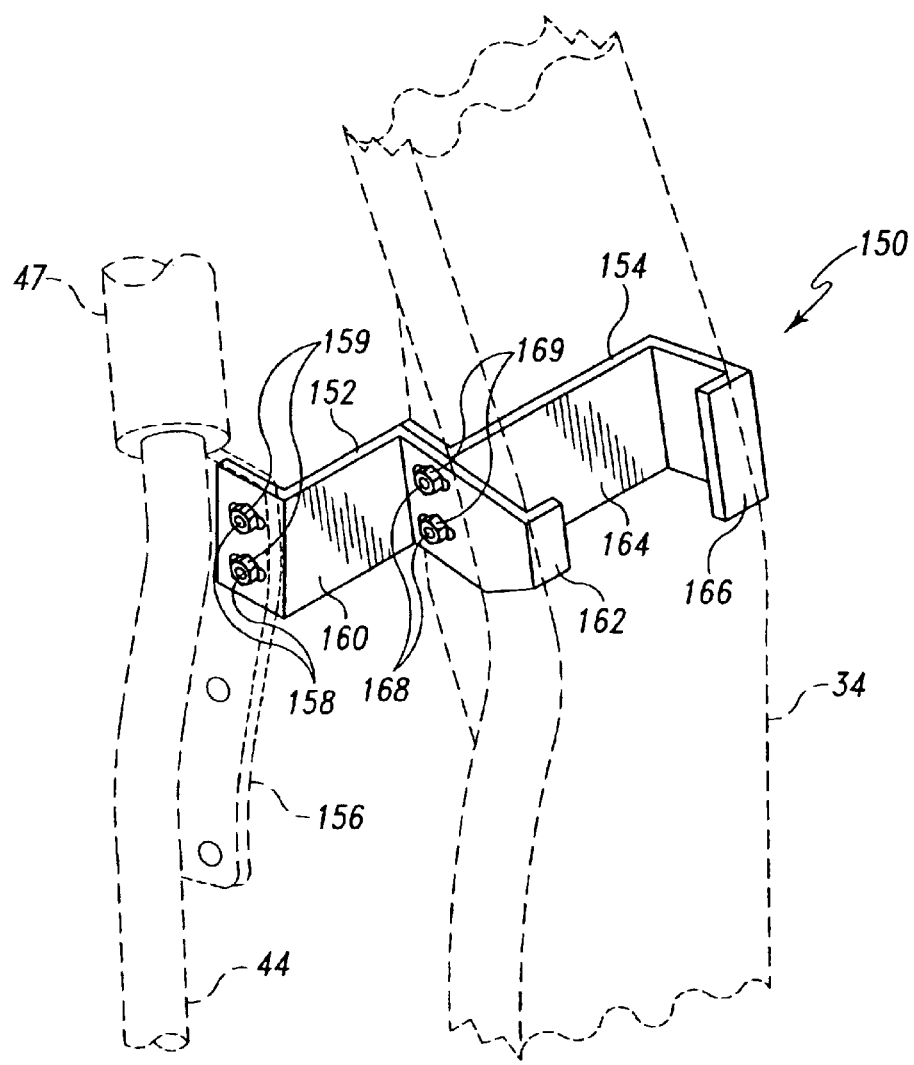
FIG. 3 is a detail perspective view of a pillar clamp of the present invention illustrating the pillar clamp attached to the pillar of a vehicle.

Referring now to FIGS. 2 and 3, a passenger side pillar coupler 150 is illustrated for attachment of the upright 42 to the passenger side pillar 34 of the vehicle 12. The pillar coupler 150 includes a rear clamping member 152 coupled to a front clamping member 154. A mounting flange or tab 156 is supported by the upright 44 and releasably supports the rear clamping member 152, illustratively through conventional fasteners, such as bolts 158 threadably engaging nuts 159. The rear clamping member 152 and the front clamping member 154 are adapted for positioning on opposing sides of the pillar 34, thereby releasably securing the frame 40 and the front panel 48 to the pillar 34. The rear clamping member 152 includes a laterally and longitudinally extending body portion 160 having an inwardly facing locking lip 162. Likewise, the front clamping member 154 includes a laterally and longitudinally extending body portion 164 having an inwardly facing locking lip 166, wherein the locking lips 162 and 166 face each other to cooperate therebetween by wrapping around at least a portion of the "B" pillar 34, thereby securing the coupler 150 from movement relative thereto. A releasable securing device, such as bolts 168 threadably engaging nuts 169, are utilized to secure the front coupling 154 to the rear coupling 152.

As shown in FIGS. 1 and 2, side mounting tabs 170 may be used in combination with mounting tabs 156 to support a gap panel (not shown). The gap panel may be of the type well known in the art and provides a barrier between the edge of the upright 42 and the pillar 34.

Figure 4:
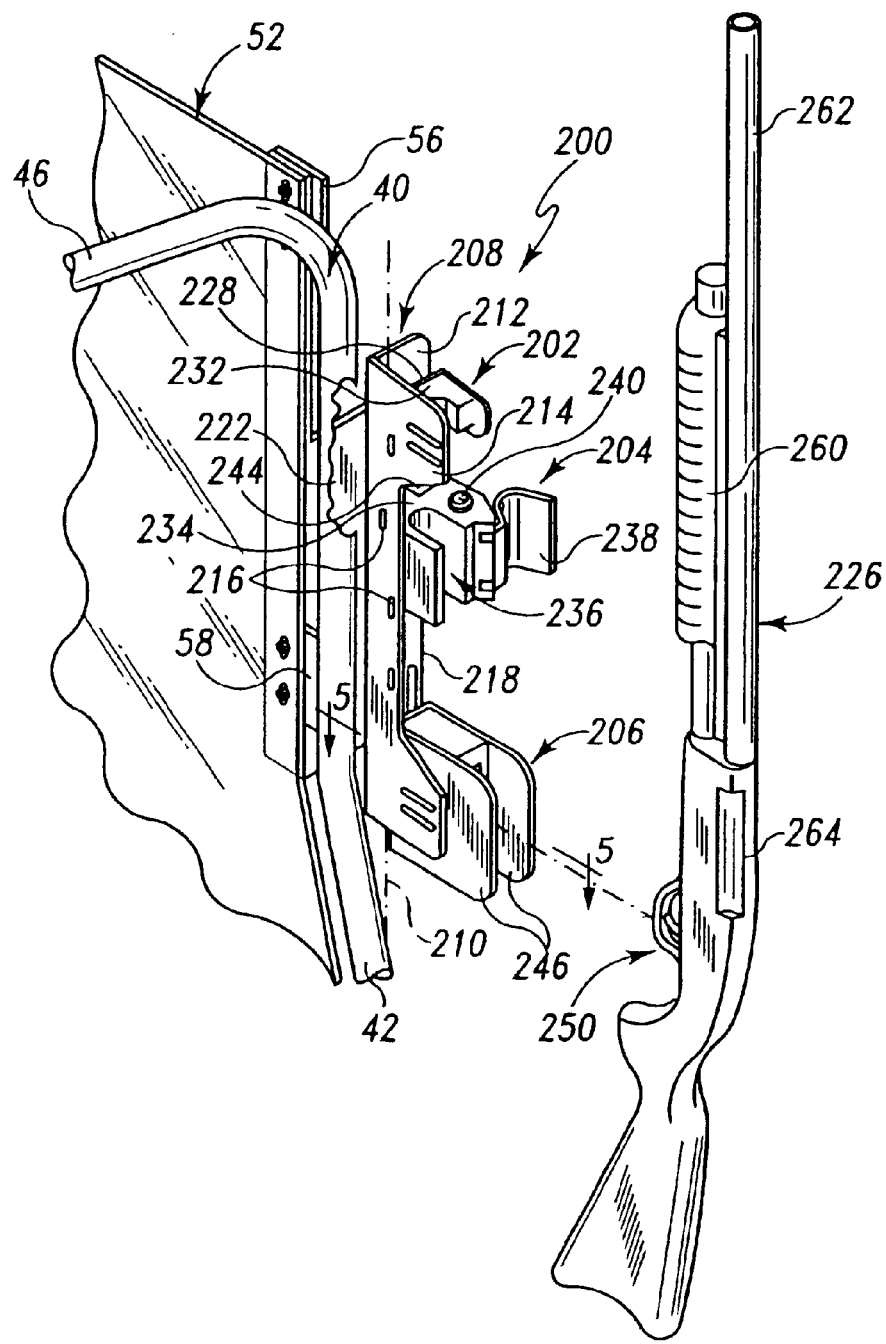
FIG. 4 is a perspective view with a cut-away, illustrating a gun rack supported by the security partition of FIG. 1.

The security partition 10 may illustratively support a gun rack 200 as shown in FIGS. 4–6. The gun rack 200 includes a barrel rest 202, a lock mechanism 204, and a weapon trigger guard 206, all of which are coupled to an elongated support 208. The elongated support 208 is configured to be coupled to an interior surface in the vehicle 12. More particularly, the gun rack 200 as illustrated in FIG. 4 is coupled to the security partition 10 such that a longitudinal axis 210 of the elongated support 208 is disposed substantially vertical. The elongated support 208 illustratively includes a base 212 and a side wall 214, each of which may include mounting holes 216 and/or slots 218 through which mechanical fasteners, such as bolts 220, may be inserted or extend to secure the gun rack 200 in the vehicle 12. In FIG. 4, the base 212 is secured to an L-shaped coupling 222 which, in turn, is secured to at least one of the mounting tabs 56, 58, and 60 of the side panel 52. Each of the barrel rest 202, the lock mechanism 204 and the weapon trigger guard 206 may be coupled to either or both of the base 212 and side wall 214 of the elongated support 208. Such coupling is adjustable as desired by utilizing the mounting slots 218 and mechanical fasteners, such as bolts 220 which threadably receive nuts 224. According to one embodiment, the barrel rest 202 and the lock mechanism 204 may be mounted to the side wall 214, with the position of the barrel rest 202 being adjustable, and the weapon trigger guard 206 may be mounted in an adjustable manner to the base 212.

The barrel rest 202 is configured to receive and cradle a front portion of a weapon 226. The barrel rest 202 can be a U-shaped metal coupling 228 having a leg (not shown) which is secured to the side wall 214 of the elongated support 208. The U-shaped metal coupling 228 can be provided with a layer of padding material 232 such as rubber, dense foamed rubber or plastic or polymeric material. The lock mechanism 204 includes a base 234 having a padded, e.g. felt, covered channel 236 for receiving the weapon 226 and a pivotal cover 238 coupled to the base 234. When the pivotal cover 238 of the lock mechanism 204 is in an open position as depicted in FIG. 4, the weapon 226 may be placed in the channel 236. Once the weapon 226 is positioned in the channel 236, the pivotal cover 238 may be pivoted into a closed position. When the pivotal cover 238 is pivoted into its closed position, the internal locking mechanism provided in the base 234 locks the pivotal cover 238 in its closed position. The internal locking mechanism used in the present invention may comprise an electrically operated lock mechanism 240 having a key override. Such a lock mechanism is illustratively described in U.S. Pat. No. 4,949,559, the complete disclosure of which is hereby expressly incorporated by reference and is available from Pro-Gard Industries of Indianapolis, Ind. However, it should be understood that any conventional gun lock may be used in accordance with the present invention.

The lock mechanism 240 may be coupled to the elongated support 208 by a conventional coupling (not shown) which is provided beneath the base 212. The coupling 242 includes a blocking tab 244 which projects in front of the lock mechanism 240 so as to provide an abutment that limits rearward movement of the weapon 226.

With further reference to FIGS. 5 and 6, the weapon trigger guard 206 comprises a U-shaped structure having a pair of spaced apart side walls 246 which define a channel 248 therebetween. As depicted in FIG. 6, the side walls 246 are wide enough to extend beyond the rear and front of the trigger assembly 250 of the weapon 226. As depicted in FIG. 5, the side walls 246 can be tall enough to cradle and shield the portion of the weapon 226 above the trigger assembly 250.

The weapon trigger guard 206 includes an inset 252 that comprises a block of material which is secured within the channel 248, and which includes a closed ended slot 254 configured and positioned in an upper surface 256 thereof to receive the trigger assembly 250. The insert 252 is formed of a padding material which is sufficiently dense to prevent unauthorized persons from gaining access to the trigger assembly 250 by digging their fingers into the insert 252. Suitable materials include hard foamed rubbers having densities of about 3–5 pounds per cubic foot and higher, with minimum densities of about 4 pounds per cubic foot being preferred. In alternative embodiments, the insert 252 could be a solid structure formed from a plastic, resinous or polymeric material. In further embodiments, the insert 252 could be formed from a rigid material such as a metal, wood, fiberglass, etc., in which case the upper surface 256 of the insert 252 and the slot 254 could be provided with a layer of padding such as felt to avoid scratching or marring the weapon 226.

The insert 252 can be secured in weapon trigger guard 206 by mechanical and/or chemical means. For example, the insert 252 can be chemically bonded to the bottom 258 and the side walls 246 of the channel 248 by means of any suitable glue, cement, epoxy, etc. Mechanical means such as pins, rivets, bolts, flanges formed on the side walls 246, etc. can also be used to secure the insert 252 in the weapon trigger guard 206.

The barrel rest 202 receives the arm 260 and the barrel 262 of the weapon 226. The lock mechanism 204 receives a portion of the weapon 226 which is located between the arm 260 and the chamber housing 264. The weapon trigger guard 206 receives the trigger assembly 250 as depicted in FIGS. 5 and 6.

When secured in the gun rack 200, the weapon 226 is prevented from being moved axially due to the abutment between the blocking tab 244 and the arm 260 and between the chamber housing 264 and the lock mechanism 240. By preventing such axial movement, the trigger assembly 250 cannot be slid out of the weapon trigger guard 206. In addition, by blocking movement of the arm 260 by the blocking tab 244, the loading mechanism cannot be operated to load a round into the firing chamber of the weapon 226.

The axis of the weapon 226 is non-parallel to the axis 210 of the elongated support 208. Accordingly, the top surface of inset 252 can be sloped to match the lower surfaces of the weapon 226. According to one embodiment of the present invention, the barrel rest 202 can be vertically adjustable on the side wall 214 of the elongated support 208 and the weapon trigger guard 206 can be horizontally adjustable along two axes on the base 212 of the elongated support 208. Such adjustment will enable the gun rack 200 to be adapted for use in conjunction with different weapons.

Figure 8:
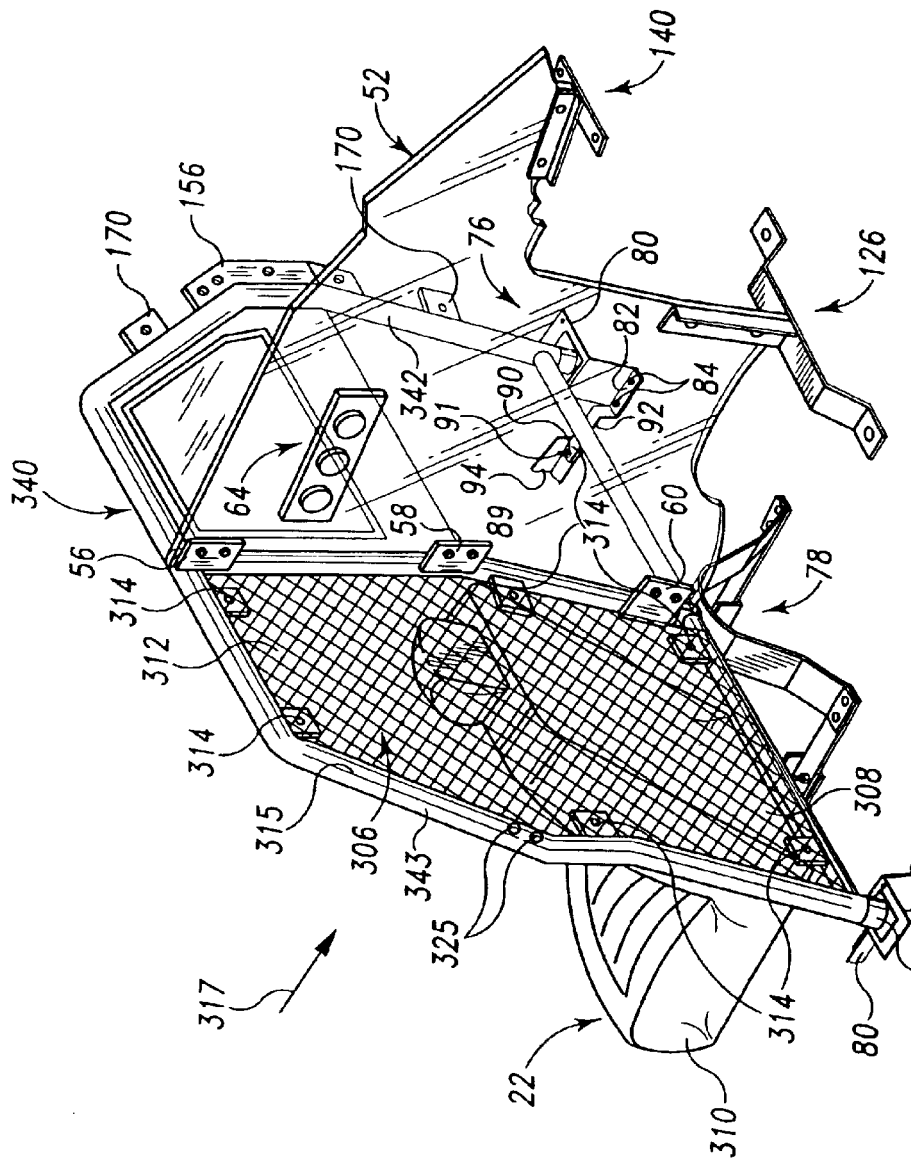
FIG. 8 is a perspective view similar to FIG. 7 illustrating a further embodiment of the security partition of the present invention.
Figure 9:
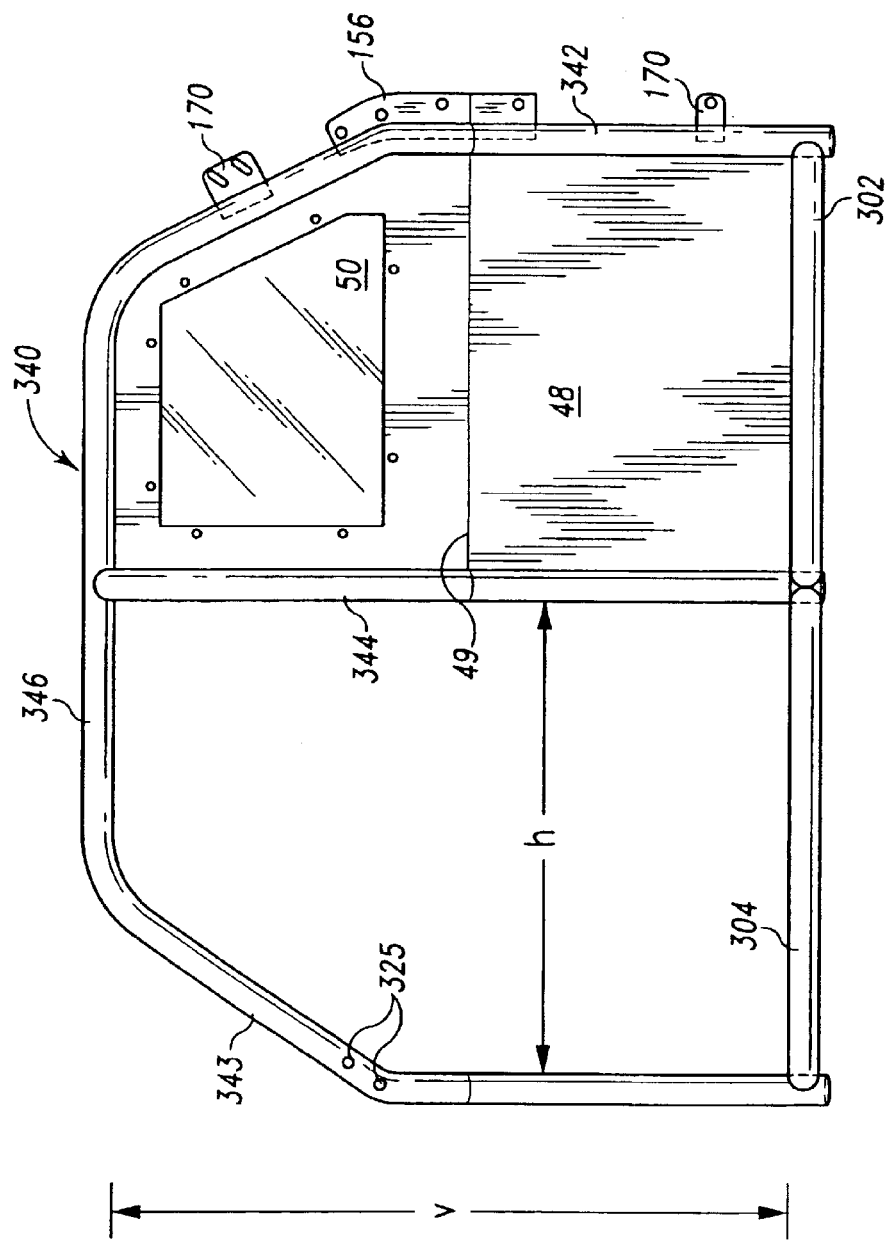
FIG. 9 is a rear elevational view of the front panel and frame of the security partition of FIG. 7.

Turning now to FIGS. 7–9, an alternative embodiment of the security partition 300 of the present invention is illustrated. In the following description, it should be noted that similar reference numerals refer to similar components as described above with respect to the embodiment of FIGS. 1–3. The security partition 300 of FIG. 7 differs from the security partition 10 of FIG. 1 in that the partition 300 includes a frame 340 which extends substantially across the entire interior width of the vehicle 12 between the passenger side 16 and the driver side 14.

More particularly, the frame 340 includes a passenger side upright 342 disposed adjacent the passenger side door and "B" pillar 34 of the vehicle 12 and a driver side upright 343 positioned adjacent the driver side door and "B" pillar 32 of the vehicle 12. The frame 340 further comprises an intermediate or center upright 344 disposed proximate the center of the vehicle 12 between the passenger side upright 342 and the driver side upright 343. The uprights 342, 343, and 344 support a laterally extending upper member 346, wherein the uprights 342, 343, and 344 and the upper member 346 illustratively define a substantially W-shaped rollbar which is inverted such that the uprights 342, 343, and 344 extend downwardly from the upper member 346. More particularly, the upper member 346 is configured to contact the roof 30 of the vehicle 12 and may provide additional structural support to the roof 30. Both the passenger side upright 342 and the driver side upright 343 are illustratively secured to the floor 28 by side floor mounts 76 of the type described above. Further, the intermediate upright 344 is illustratively attached to the floor 28 by the center floor mount 78 of the type described above.

A pair of laterally extending members or struts 302 and 304 are positioned below the upper member 346 to provide added rigidity and structural support to the entire frame 340. The first strut 302 extends between the passenger side upright 342 and the intermediate upright 344, while the second strut 304 extends between the driver side upright 343 and the intermediate upright 344. In the illustrated embodiment of FIG. 7, the passenger side upright 342, the driver side upright 343, and the upper member 346 are formed into a substantially U-shape from an integral piece of tubular steel. The intermediate upright 344 may also comprise a tubular steel member which is welded to the upper member 346. A protective cover (not shown) may be positioned over a portion of the frame 340 in a manner similar to the cover 50 of FIG. 1, as described above.

Referring further to FIGS. 7–9, a clearance area 306 is defined between the driver side upright 343 and the intermediate upright 344 in a lateral, horizontal direction, and between the upper member 346 and the second strut 304 in a vertical direction. Typically, the seat back 308 of the driver seat 22 is pivotably mounted relative to the base 310 of the seat 22, wherein the seat back 308 may be reclined and locked in a plurality of positions through the use of a handle or lever (not shown) in a manner well known in the art. In certain circumstances, particularly during an impact to the rear of the vehicle 12, the seat back 308 of the driver seat 22 releases in order to freely pivot rearwardly. This release of the seat back 308 effectively adsorbs some of the energy from the impact in order to protect the driver. In an illustrative embodiment of the security partition 300, the clearance area 306 is defined to permit passage of the pivoting seat back 308 between the driver side upright 343 and the intermediate upright 344, and the upper member 346 and second strut 304. More particularly, the lateral, horizontal dimension "h" and the vertical dimension "v" of the clearance area 306 are defined in a manner to provide for the free, unimpeded rearward passage of the pivoting driver seat back 308 as illustrated in phantom in FIG. 7.

Referring to the alternative embodiment of FIG. 8, a driver side guard panel 312 may be supported by the frame 340 adjacent to the clearance area 306. The guard panel 312 may comprise any conventional barrier material, such as thermoplastic material, sheet metal or wire mesh. In FIG. 9, wire mesh having holes small enough to substantially prevent finger access therethrough is illustrated for exemplary purposes. The guard panel 312 is attached in a conventional manner, for example by welding, to a plurality of mounting flanges or tabs 314 extending inwardly toward the clearance area 306 from proximate a rear surface 315 of the frame 340. Each mounting tab 314, in turn, is secured to the frame 340 illustratively, again, by welding. The attachment between the guard panel 312 and the mounting tabs 314 is designed such that the panel 312 will detach from the tabs 314 upon the application of a predetermined force in a rearward direction as represented by arrow 317 in FIG. 8. As such, when the driver seat back 308 impacts the guard panel 312 with at least the predetermined force, the attachment between the mounting tabs 314 and the guard panel 312 releases, thereby permitting the guard panel 312 to move rearwardly and not substantially inhibit rearwardly pivoting movement of the driver seat back 308. The value of the predetermined force is a function of the number of mounting tabs 314 and the attachment strength between each mounting tab 314 and the panel 312.

Figure 10:
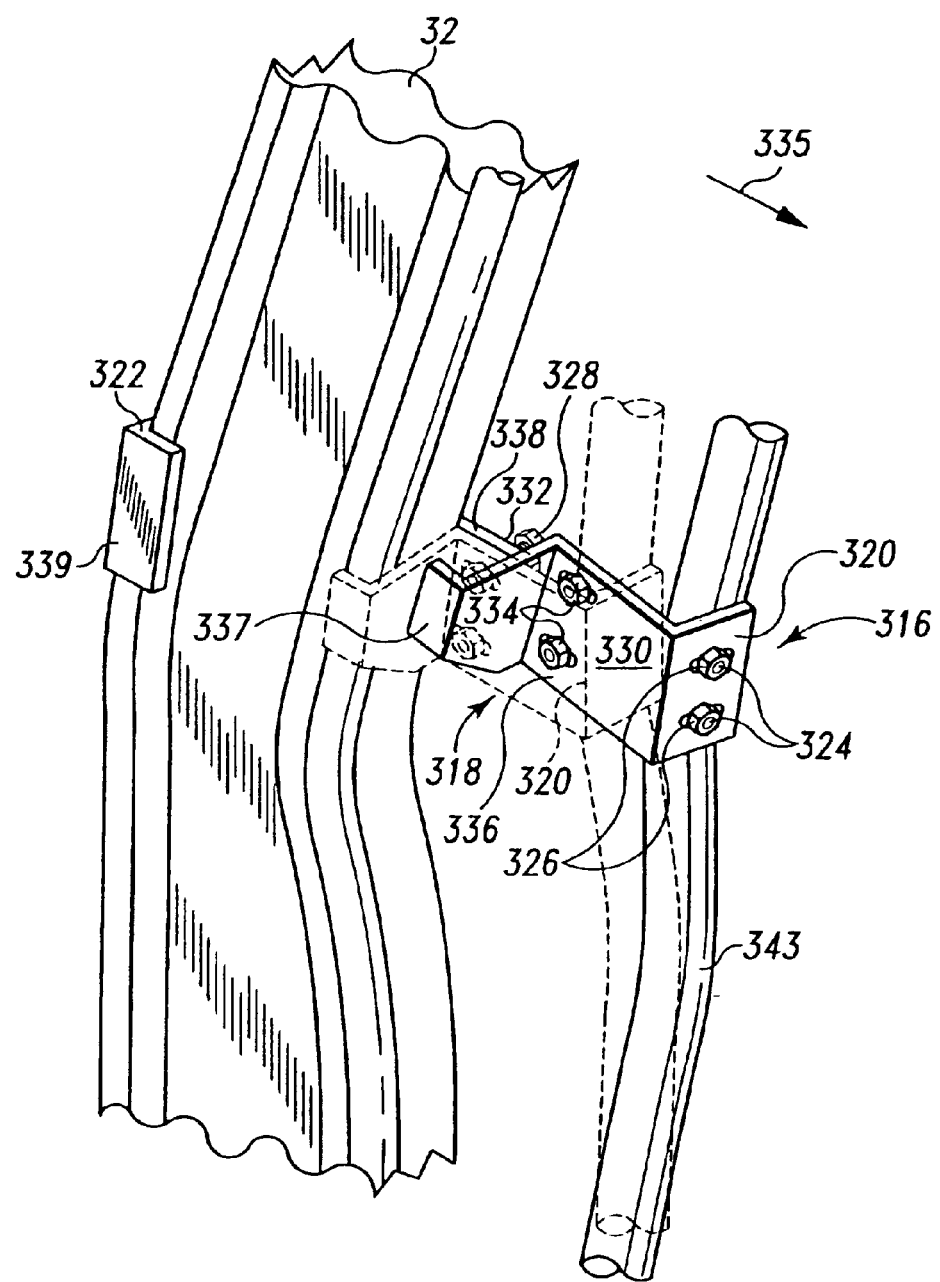
FIG. 10 is a detail perspective view of a breakaway pillar clamp of the present invention, illustrating a normal use position in phantom line and a breakaway position in solid line.

A first or passenger side pillar coupler 150 is utilized to attach the passenger side upright 342 to the passenger side pillar 34 in the manner detailed above with respect to FIGS. 1–3. In one illustrative embodiment, a substantially identical pillar coupler 150 is utilized to attach the driver side upright 343 to the driver side pillar 32. In a further illustrative embodiment as shown in FIG. 10, a second or driver side, breakaway pillar coupler 316 is utilized to attach the driver side upright 343 to the driver side pillar 32. The second pillar coupler 316 includes a breakaway device 318 which facilitates detachment of the driver side upright 343 from the driver side pillar 32 upon application of a predetermined force. In such a circumstance, should the driver seat back 308 move rearwardly into contact with the driver side upright 343 with at least a predetermined force, then the second pillar coupler 316 releases the frame 340 from the driver side pillar 32. As such, rearward movement of the seat back 308 of the driver seat 22 will not be substantially impeded by the frame 340.

Referring further to FIG. 10, the second pillar coupler 316 illustratively includes a rear clamping member 320 supporting a front clamping member 322. The rear clamping member 320 is secured to the driver side upright 343 through conventional fasteners, such as bolts 324 passing through mounting apertures 325 formed within the upright 343 (FIG. 9) and threadably received within nuts 326. The front clamping member 322 is releasably secured to the rear clamping member 320 by the breakaway device 318. In the illustrative embodiment, the breakaway device 318 comprises a pair of bolts 328 passing through a connection plate 330 of the rear clamping member 320 and a connection plate 332 of the front clamping member 322 and then threadably received within nuts 334. The connection plates 330 and 332 are configured to be disposed parallel to and juxtaposed with each other.

Upon the application of a predetermined force on the driver side upright 343 in a longitudinal direction as represented by arrow 335, the bolts 328 will shear thereby releasing the rear clamping member 320 from the front clamping member 322. The predetermined force required to shear the bolts 328 is based upon the minor thread diameter, type of material and grade of material of the bolts 328. The rear clamping member 320 includes a laterally and longitudinally extending body portion 336 having an inwardly facing locking lip 337, while the front mounting member 322 likewise includes a body portion 338, extending laterally and longitudinally, having an inwardly facing locking lip 339. The locking lips 337 and 339 of the rear and front clamping members 320 and 322 are spaced longitudinally on opposite sides of the driver side pillar 32 and cooperate to securely clamp the driver side pillar coupler 316 to the driver side pillar 32.

Figure 11:
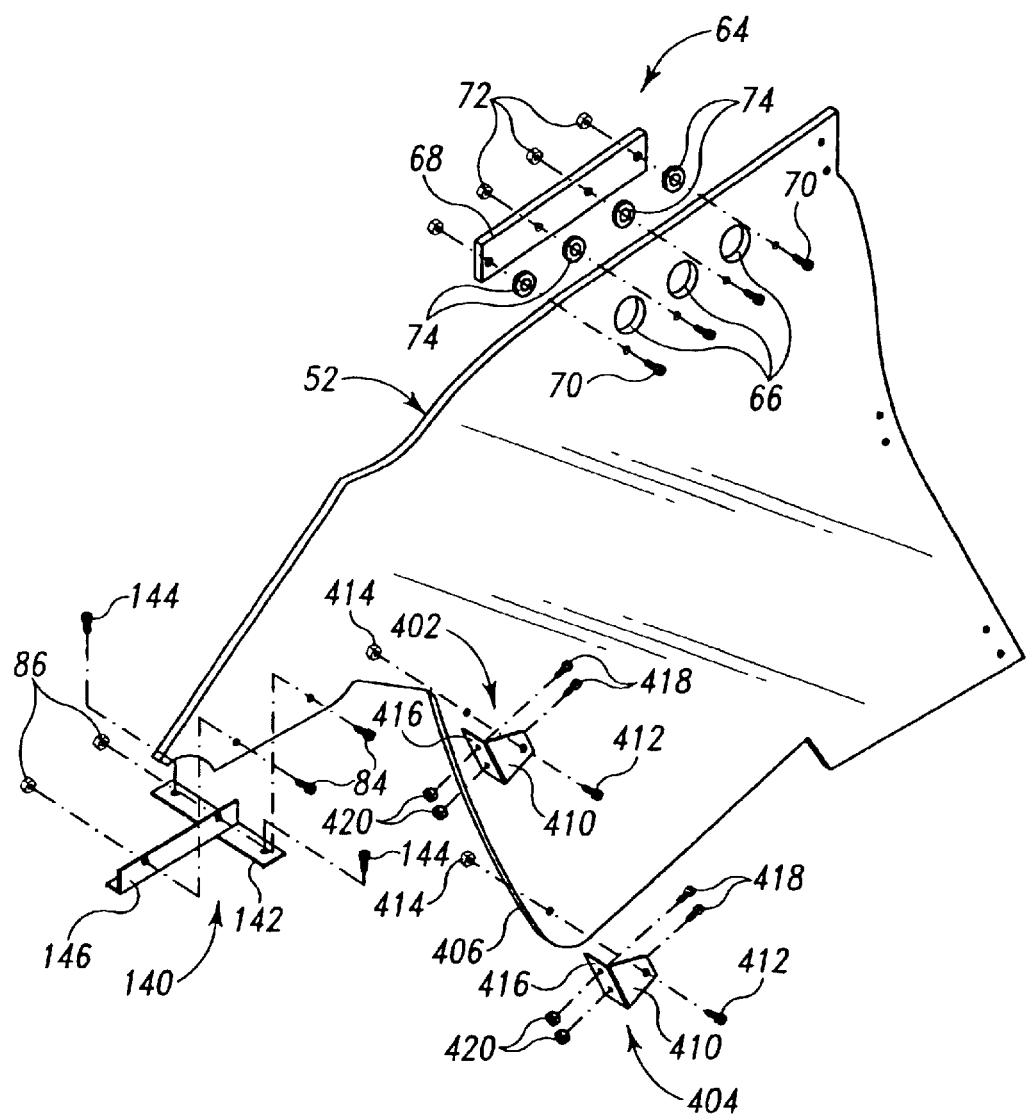
FIG. 11 is an exploded perspective view illustrating a further embodiment of the side panel of the present invention.
Figure 12:
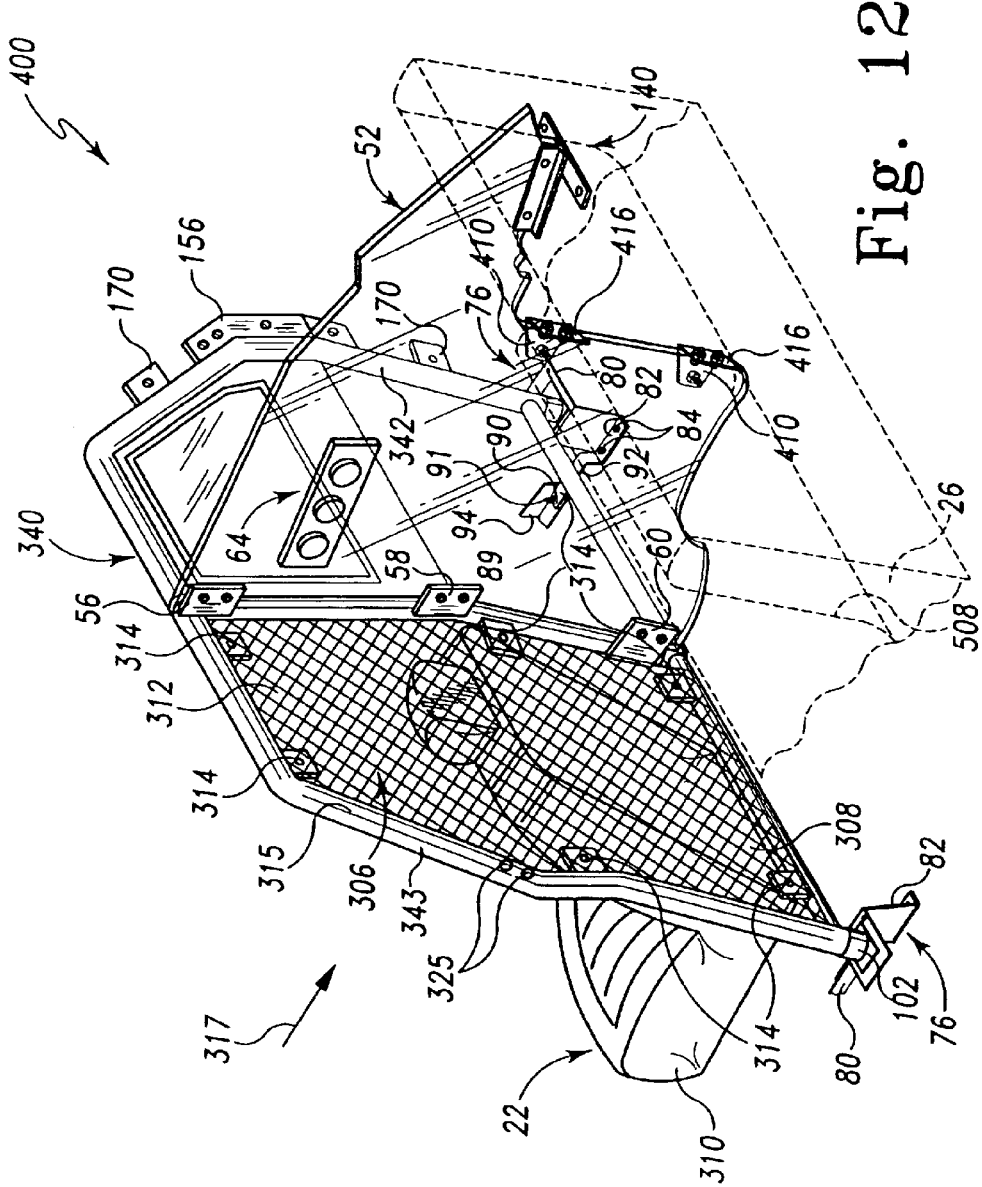
FIG. 12 is a perspective view similar to FIG. 8 illustrating another embodiment of the security partition of the present invention.

Turning now to FIGS. 11 and 12, a further illustrative embodiment of the security partition 400 of the present invention is illustrated. In the following description, it should be noted that similar reference numerals refer to similar components as described above with respect to the embodiments of FIGS. 1–3 and 7–10. The security partition 400 of FIGS. 11 and 12 differs from the security partition 300 of FIGS. 7–9 in the mounting structures utilized to couple the partition 400 to the vehicle 12. More particularly, the center floor mount 78 is removed in its entirety such that the frame 40 is supported by the side floor mounts 76 coupled to the passenger side upright 342 and the driver side upright 343. The security partition 400 in FIGS. 11 and 12 further differs from the security partition 300 in that the center seat coupling 126 is likewise removed in its entirety. Instead a pair of seat back couplings 402 and 404 are configured to secure a rear edge 406 of the side panel 52 to the back 408 of the rear seat 26. In the embodiment of FIGS. 11 and 12, the security partition 400 is specifically adapted for use with replacement prisoner transfer seats having a substantially rigid surface to which the seat back couplings 402 and 404 may be secured. Such a prisoner transfer seat, as detailed above, may comprise a prisoner rear seat Model No. 3S6001FG available from Pro-Gard Industries of Indianapolis, Ind.

Each of the seat back couplings 402 and 404 includes a first flange 410 configured to be secured to the side panel 52 by conventional bolt 412 which threadably receives a nut 414. The seat back coupling 402 and 404 each further include a second flange 416 disposed substantially perpendicular to the first flange 410 thereby defining a substantially L-shape. The second flange 416 is configured to be secured to the back 408 of the seat 26 again through the use of conventional bolts 418 which threadably receive nuts 420.

Turning now to FIGS. 13–14, a further illustrative embodiment of the security partition 500 is illustrated. Again, it should be noted that in the following description, similar reference numerals refer to similar components as described above with respect to the previous embodiments of FIGS. 1–3 and 7–12. The security partition 500 of FIGS. 13 and 14 differs from the previous embodiments in that no coupling, such as the center seat coupling 126 or the seat back couplings 402 and 404, fixes the side panel 52 to the rear seat 26. Instead, in the embodiment of FIGS. 12 and 13, a channel 502 is molded in the thermoplastic rear seat 26. Again, as with the security partition 400, the security partition 500 is configured to be utilized with a specially designed prisoner transfer rear seat which replaces the conventional OEM rear seat. The channel 502 is defined by first and second walls 504 and 506 which extend rearwardly from proximate a front edge of the seat to the seat back 508. A lower edge 510 of the side panel 52 is retained within the channel 502 to prevent lateral movement thereof. Furthermore, the first and second walls 504 and 506 provide a barrier to prevent the passage of fluids beneath the side panel 52.

Figure 15:
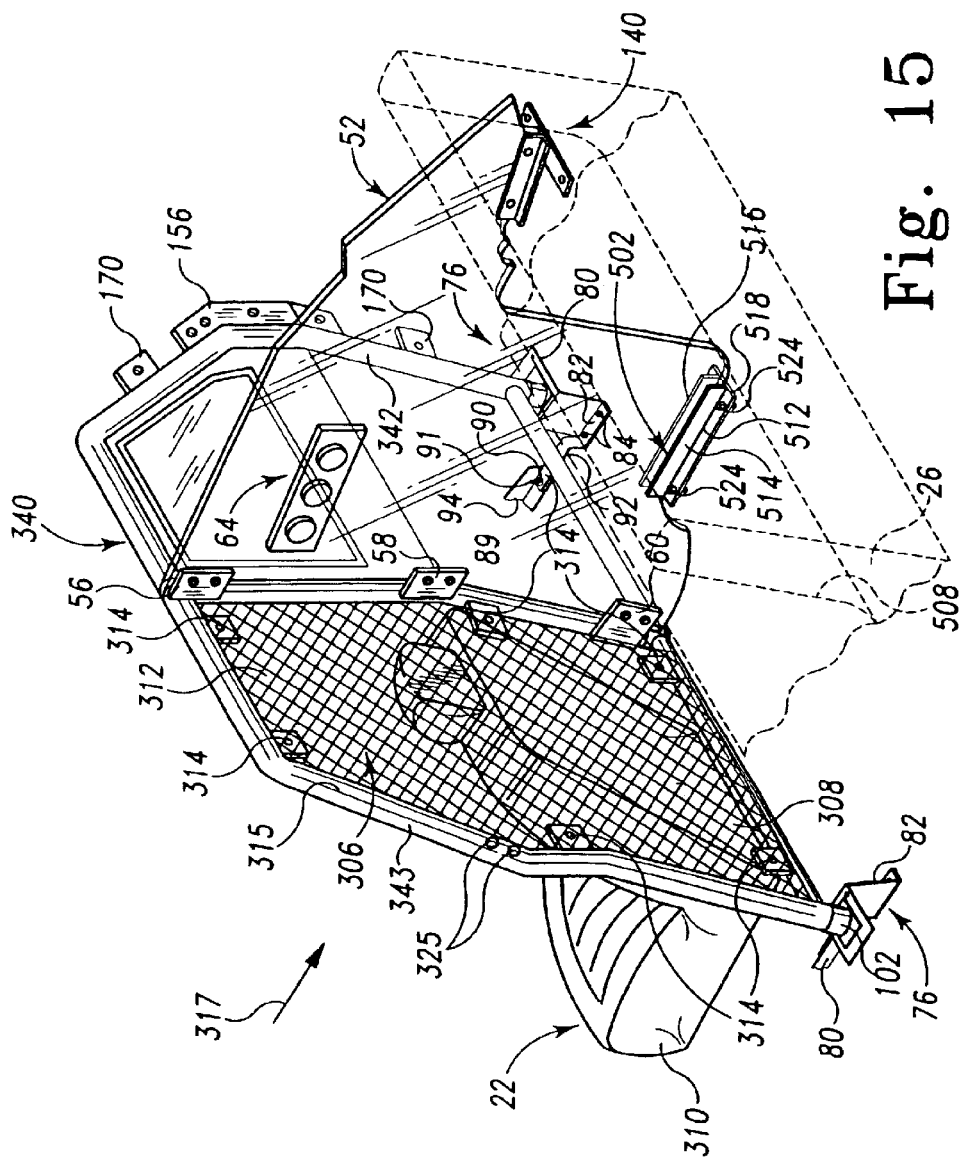
FIG. 15 is a perspective view similar to FIG. 13 illustrating a further embodiment of the security partition of the present invention.

Referring now to FIG. 15, in a further alternative embodiment, the first channel 5029 may be defined by a U-shaped member 512 including first and second upstanding walls 514 and 516 extending from a base 518. Illustratively, the base 518 may be secured to the seat 26 through the use of conventional fasteners, such as bolts 524.

It should be further noted that the security partition of the present invention may be utilized not only in combination with replacement prisoner transfer seats as identified above, but with prisoner transfer floor pans. The floor pans are positioned on the floor of the vehicle intermediate the front and rear seats. Floor pans facilitate containment of fluids and cleaning of the rear passenger compartment. Furthermore, the floor pan may include drainage holes to assist in the removal of fluids. Such a floor pan is available as Model No. 3S6051FG from Pro-Gard Industries of Indianapolis, Ind.

While the invention has been described in detail with reference to certain illustrative embodiments, variations and modifications exist within the spirit and scope of the invention as defined in the following claims.

What is claimed is:

1. A security partition for use in a vehicle including driver and passenger sides, front and rear occupant areas, a floor, a roof, and a pair of laterally spaced pillars extending between the roof and the floor, the partition comprising:
    a front panel extending laterally within the rear occupant area;
    a side panel extending substantially perpendicular relative to the front panel in the rear occupant area; and
    a pillar clamp supporting the front panel and including a rear clamping member and a front clamping member coupled to the rear clamping member, the rear clamping member and the front clamping member being configured for positioning on opposing sides of a pillar of the vehicle for releasably securing the front panel to the pillar.

2. The security partition of claim 1, further comprising a frame connected to the front panel and including first and second vertically extending uprights and a laterally extending upper member supported by the first and second vertically extending uprights.

3. The security partition of claim 2, wherein the frame comprises a substantially u-shaped roll bar and the upper member is adapted to contact the roof of the vehicle.

4. The security partition of claim 2, further comprising a mounting tab supported by the frame, wherein the pillar clamp is releasably secured to the mounting tab.

5. The security partition of claim 2, wherein the frame further comprises at least one laterally extending lower member positioned below the upper member and extending between the first and second uprights.

6. The security partition of claim 2, further comprising a vertically extending intermediate upright positioned between the first and second uprights.

7. The security partition of claim 6, further comprising a first strut extending between the first upright and the intermediate upright and a second strut extending between the second upright and the intermediate upright.

8. The security partition of claim 6, further comprising a clearance area defined between the second upright and the intermediate upright, wherein the vehicle includes a front driver seat having a seat back positioned within the front occupant area proximate the driver side, and the clearance area has a vertical dimension and a lateral dimension sufficient to allow passage of the seat back therethrough.

9. The security partition of claim 2, further comprising at least one mounting tab supported by the frame, wherein the side panel is attached to the at least one mounting tab.

10. The security partition of claim 2, further comprising first and second foot mountings supported by the floor of the vehicle, wherein the first and second uprights comprise tubular members which slidably receive the first and second foot mountings.

11. The security partition of claim 10, wherein the second foot mounting is supported by a u-shaped hump coupling.

12. The security partition of claim 1, wherein the rear and front clamping members of the pillar clamp each include a body portion extending laterally relative to the pillar, the body portion supporting a locking lip, the locking lips of the rear and front clamping members facing each other to clamp the pillar and prevent movement of the pillar clamp relative to the pillar.

13. The security partition of claim 12, wherein the front clamping member is releasably secured to the rear clamping member, and the body portion of the front clamping member extends longitudinally relative to the pillar to space the locking lip of the front clamping member relative to the locking lip of the rear clamping member.

14. The security partition of claim 1, wherein the side panel includes a vent.

15. The security partition of claim 1, further comprising a center seat coupling, wherein the vehicle includes a rear seat positioned within the rear occupant area and the center seat coupling secures the side panel to the rear seat.

16. The security partition of claim 1, further comprising a package shelf coupling, wherein the vehicle includes a package shelf positioned within the rear occupant area and the package shelf coupling secures the side panel to the package shelf.

17. The security partition of claim 1, further comprising a breakaway clamp positioned in spaced relation to the pillar clamp to releasably secure the front panel to one of the pillars, the breakaway clamp adapted to detach the front panel from the pillar upon application of a predetermined force.

18. The security partition of claim 1, further comprising a gun rack including an elongated support defining a longitudinal axis, the elongated support positioned with the longitudinal axis extending substantially vertical.

19. The security partition of claim 18, wherein the gun rack includes a trigger guard provided proximate an end of the elongated support, the trigger guard including:

a base having two spaced apart side walls which extend upward from the base to form a channel for receiving a trigger assembly of a weapon; and an insert secured in the channel and including a slot in an upper surface thereof for receiving a trigger and trigger guard of the weapon, the insert having a height which is substantially less than a height of each of the two side walls so that the two side walls extend upward beyond the insert to receive a portion of a weapon therebetween.

20. The security partition of claim 18, wherein the gun rack includes:

a barrel rest provided adjacent one end of the elongated support for receiving a barrel of a weapon;

a lock mechanism provided at a central portion of the elongated support for receiving and securing the weapon therein; and a weapon trigger guard provided on another end of the elongated support for receiving a trigger portion of the weapon therein, the weapon trigger guard including, a base having two spaced apart side walls which extend upward from the base to form a channel for receiving a trigger assembly of the weapon, and an insert secured in the channel and including a slot in an upper surface thereof for receiving a trigger and trigger guard of the weapon.

* * * * *